United States Patent
Nolan et al.

(10) Patent No.: US 9,142,240 B2
(45) Date of Patent: Sep. 22, 2015

(54) APPARATUS INCLUDING A PERPENDICULAR MAGNETIC RECORDING LAYER HAVING A CONVEX MAGNETIC ANISOTROPY PROFILE

(75) Inventors: Thomas Patrick Nolan, Fremont, CA (US); Hans Jürgen Richter, Palo Alto, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 260 days.

(21) Appl. No.: 12/847,745

(22) Filed: Jul. 30, 2010

(65) Prior Publication Data

US 2012/0026626 A1  Feb. 2, 2012

(51) Int. Cl.
G11B 5/66 (2006.01)
G11B 5/82 (2006.01)
G11B 5/65 (2006.01)

(52) U.S. Cl.
CPC .. G11B 5/82 (2013.01); G11B 5/66 (2013.01); G11B 5/65 (2013.01)

(58) Field of Classification Search
None
See application file for complete search history.

(56) References Cited

U.S. PATENT DOCUMENTS

| | | | |
|---|---|---|---|
| 3,337,075 A | 8/1967 | Stein | |
| 4,103,315 A | 7/1978 | Hempstead et al. | |
| 4,262,116 A | 4/1981 | Johnson | |
| 4,404,609 A | 9/1983 | Jones, Jr. | |
| 4,442,159 A | 4/1984 | Dezawa et al. | |
| 4,576,700 A | 3/1986 | Kadokura et al. | |
| 4,636,448 A | 1/1987 | Morita et al. | |
| 4,642,270 A | 2/1987 | Morita et al. | |
| 4,643,942 A | 2/1987 | Ohtsubo et al. | |
| 4,649,073 A | 3/1987 | Suzuki et al. | |
| 4,652,479 A | 3/1987 | Suzuki et al. | |
| 4,656,546 A | 4/1987 | Mallory | |
| 4,722,869 A | 2/1988 | Honda et al. | |

(Continued)

FOREIGN PATENT DOCUMENTS

| | | |
|---|---|---|
| JP | 62-134817 | 6/1987 |
| JP | 4-153910 | 5/1992 |

(Continued)

OTHER PUBLICATIONS

Machine Translation of JP 2010-123196-A (pat published 2010).*

(Continued)

*Primary Examiner* — Kevin Bernatz
(74) *Attorney, Agent, or Firm* — Hollingsworth Davis, LLC

(57) ABSTRACT

An apparatus may include a first magnetic layer, a first exchange break layer formed on the first magnetic layer, a second magnetic layer formed on the first exchange break layer, a second exchange break layer formed on the second magnetic layer, and a third magnetic layer formed on the second exchange break layer. The first magnetic layer has a first magnetic anisotropy energy, $H_{k1}$, the second magnetic layer has a second magnetic anisotropy energy, $H_{k2}$, and the third magnetic layer has a third magnetic anisotropy energy, $H_{k3}$. In some embodiments, $H_{k1}-H_{k2}$ is less than $H_{k2}-H_{k3}$. In some embodiments, the apparatus may be a perpendicular magnetic recording medium.

21 Claims, 8 Drawing Sheets

(56) References Cited

U.S. PATENT DOCUMENTS

| | | | |
|---|---|---|---|
| 4,748,525 A | 5/1988 | Perlov | |
| 4,763,215 A | 8/1988 | Gueugnon et al. | |
| 4,767,516 A | 8/1988 | Nakatsuka et al. | |
| 4,780,354 A | 10/1988 | Nakayama et al. | |
| 4,982,301 A | 1/1991 | Endo | |
| 4,992,338 A | 2/1991 | Hatwar et al. | |
| 5,094,925 A | 3/1992 | Ise et al. | |
| 5,196,976 A | 3/1993 | Lazzari et al. | |
| 5,224,080 A | 6/1993 | Ohtsuki et al. | |
| 5,227,212 A | 7/1993 | Ahlert et al. | |
| 5,290,629 A | 3/1994 | Kobayashi et al. | |
| 5,325,343 A | 6/1994 | Ohtsuki et al. | |
| 5,329,413 A | 7/1994 | Kondoh et al. | |
| 5,343,449 A | 8/1994 | Miyata et al. | |
| 5,347,485 A | 9/1994 | Taguchi et al. | |
| 5,408,377 A | 4/1995 | Gurney et al. | |
| 5,486,967 A | 1/1996 | Tanaka et al. | |
| 5,525,398 A | 6/1996 | Takai et al. | |
| 5,567,523 A | 10/1996 | Rosenblum et al. | |
| 5,636,093 A | 6/1997 | Gijs et al. | |
| 5,640,374 A | 6/1997 | Hirokane et al. | |
| 5,644,566 A | 7/1997 | Nakayama et al. | |
| 5,659,537 A | 8/1997 | Hirokane et al. | |
| 5,660,930 A | 8/1997 | Bertero et al. | |
| 5,702,830 A | 12/1997 | Miller et al. | |
| 5,703,795 A | 12/1997 | Mankovitz | |
| 5,725,963 A | 3/1998 | Iwasaki et al. | |
| 5,736,235 A | 4/1998 | Matsuda et al. | |
| 5,795,663 A | 8/1998 | Koike et al. | |
| 5,830,569 A | 11/1998 | Hikosaka et al. | |
| 5,834,085 A | 11/1998 | Lairson et al. | |
| 5,834,111 A | 11/1998 | Lal et al. | |
| 5,854,727 A | 12/1998 | Tanaka et al. | |
| 5,922,442 A | 7/1999 | Lal et al. | |
| 5,933,297 A | 8/1999 | Hoshiya et al. | |
| 5,976,326 A | 11/1999 | Ranjan et al. | |
| 5,991,125 A | 11/1999 | Iwasaki et al. | |
| 5,995,338 A | 11/1999 | Watanabe et al. | |
| 5,995,341 A | 11/1999 | Tanaka et al. | |
| 6,031,692 A | 2/2000 | Kawawake et al. | |
| 6,077,586 A | 6/2000 | Bian et al. | |
| 6,117,011 A | 9/2000 | Lvov et al. | |
| 6,146,775 A | 11/2000 | Fujita et al. | |
| 6,174,597 B1 | 1/2001 | Yusu et al. | |
| 6,177,208 B1 | 1/2001 | Yamamoto et al. | |
| 6,183,893 B1 | 2/2001 | Futamoto et al. | |
| 6,221,508 B1 | 4/2001 | Kanbe et al. | |
| 6,242,085 B1 | 6/2001 | Ryonai et al. | |
| 6,280,813 B1 | 8/2001 | Carey et al. | |
| 6,327,227 B1 | 12/2001 | Katayama | |
| 6,395,413 B1 | 5/2002 | Ando | |
| 6,420,058 B1 | 7/2002 | Haratani et al. | |
| 6,430,115 B1 | 8/2002 | Hirokane et al. | |
| 6,468,670 B1 | 10/2002 | Ikeda et al. | |
| 6,495,252 B1 | 12/2002 | Richter et al. | |
| 6,528,149 B2 | 3/2003 | Yoshida et al. | |
| 6,531,202 B1 | 3/2003 | Litvinov et al. | |
| 6,534,203 B2 | 3/2003 | Iwasaki et al. | |
| 6,562,453 B1 | 5/2003 | Futamoto et al. | |
| 6,602,612 B2 | 8/2003 | Abarra et al. | |
| 6,602,621 B2 | 8/2003 | Matsunuma et al. | |
| 6,686,070 B1 | 2/2004 | Futamoto et al. | |
| 6,699,600 B2 | 3/2004 | Shimizu et al. | |
| 6,754,020 B1 | 6/2004 | Hikosaka et al. | |
| 6,777,112 B1 | 8/2004 | Girt et al. | |
| 6,777,730 B2 | 8/2004 | Daughton et al. | |
| 6,830,824 B2 * | 12/2004 | Kikitsu et al. | 428/828.1 |
| 6,866,948 B2 | 3/2005 | Koda et al. | |
| 6,875,492 B1 | 4/2005 | Pirzada et al. | |
| 6,884,520 B2 | 4/2005 | Oikawa et al. | |
| 6,890,667 B1 | 5/2005 | Lairson et al. | |
| 6,914,749 B2 | 7/2005 | Chang et al. | |
| 7,060,376 B1 | 6/2006 | Chang et al. | |
| 7,153,546 B2 | 12/2006 | Tanahashi et al. | |
| 7,192,664 B1 | 3/2007 | Wu et al. | |
| 7,201,977 B2 | 4/2007 | Li et al. | |
| 7,311,983 B2 | 12/2007 | Watanabe et al. | |
| 7,314,675 B1 | 1/2008 | Nolan | |
| 7,384,699 B2 | 6/2008 | Nolan et al. | |
| 7,488,545 B2 * | 2/2009 | Fullerton et al. | 428/828.1 |
| 7,572,527 B2 | 8/2009 | Fullerton et al. | |
| 7,625,643 B2 * | 12/2009 | Umeda et al. | 428/828 |
| 7,678,476 B2 * | 3/2010 | Weller et al. | 428/828.1 |
| 7,846,564 B2 * | 12/2010 | Li et al. | 428/828.1 |
| 7,976,965 B2 * | 7/2011 | Shimizu et al. | 428/828.1 |
| 8,119,263 B2 * | 2/2012 | Nolan et al. | 428/829 |
| 2001/0031382 A1 | 10/2001 | Kusakawa et al. | |
| 2001/0038932 A1 | 11/2001 | Uwazumi et al. | |
| 2002/0018917 A1 | 2/2002 | Sakai et al. | |
| 2002/0034666 A1 | 3/2002 | Kiely | |
| 2002/0048693 A1 | 4/2002 | Tanahashi et al. | |
| 2002/0071208 A1 | 6/2002 | Batra et al. | |
| 2002/0187368 A1 | 12/2002 | Senzaki et al. | |
| 2003/0017369 A1 | 1/2003 | Hirayama et al. | |
| 2003/0022025 A1 | 1/2003 | Futamoto et al. | |
| 2003/0064249 A1 | 4/2003 | Uwazumi et al. | |
| 2003/0082410 A1 | 5/2003 | Sato et al. | |
| 2003/0087135 A1 * | 5/2003 | Wang et al. | 428/695 |
| 2003/0091868 A1 | 5/2003 | Shimizu et al. | |
| 2003/0104247 A1 | 6/2003 | Girt | |
| 2003/0108721 A1 | 6/2003 | Fullerton et al. | |
| 2003/0108776 A1 | 6/2003 | Chang et al. | |
| 2003/0148143 A1 | 8/2003 | Kanbe et al. | |
| 2003/0180577 A1 | 9/2003 | Do et al. | |
| 2003/0215675 A1 | 11/2003 | Inaba et al. | |
| 2004/0027868 A1 | 2/2004 | Nakamura et al. | |
| 2004/0086753 A1 | 5/2004 | Inomata | |
| 2004/0110034 A1 | 6/2004 | Kawada | |
| 2004/0185306 A1 | 9/2004 | Coffey et al. | |
| 2004/0219329 A1 | 11/2004 | Oikawa et al. | |
| 2004/0224184 A1 | 11/2004 | Hikosaka et al. | |
| 2004/0247943 A1 | 12/2004 | Girt et al. | |
| 2005/0014029 A1 | 1/2005 | Takenoiri et al. | |
| 2005/0019608 A1 | 1/2005 | Kim et al. | |
| 2005/0041335 A1 | 2/2005 | Kikitsu et al. | |
| 2005/0084715 A1 | 4/2005 | Hee et al. | |
| 2005/0129984 A1 | 6/2005 | Bertero et al. | |
| 2005/0142378 A1 | 6/2005 | Nemoto et al. | |
| 2005/0142388 A1 | 6/2005 | Hirayama et al. | |
| 2005/0186358 A1 | 8/2005 | Sakai et al. | |
| 2006/0024530 A1 | 2/2006 | Nolan | |
| 2006/0139799 A1 | 6/2006 | Wu et al. | |
| 2006/0204791 A1 | 9/2006 | Sakawaki et al. | |
| 2006/0246323 A1 | 11/2006 | Liu et al. | |
| 2006/0269797 A1 | 11/2006 | Lu et al. | |
| 2006/0286413 A1 | 12/2006 | Liu et al. | |
| 2006/0292401 A1 | 12/2006 | Suzuki et al. | |
| 2007/0064345 A1 | 3/2007 | Nolan et al. | |
| 2007/0072011 A1 | 3/2007 | Li et al. | |
| 2007/0172705 A1 | 7/2007 | Weller et al. | |
| 2007/0188924 A1 | 8/2007 | Tamai et al. | |
| 2007/0275269 A1 | 11/2007 | Takahoshi et al. | |
| 2007/0287031 A1 | 12/2007 | Nolan et al. | |
| 2007/0292720 A1 * | 12/2007 | Suess | 428/828.1 |
| 2007/0298285 A1 | 12/2007 | Berger et al. | |
| 2008/0070065 A1 * | 3/2008 | Berger et al. | 428/828.1 |
| 2008/0075978 A1 * | 3/2008 | Weller et al. | 428/826 |
| 2008/0180843 A1 | 7/2008 | Zhang et al. | |
| 2008/0199735 A1 * | 8/2008 | Berger et al. | 428/828.1 |
| 2008/0292907 A1 * | 11/2008 | Berger et al. | 428/828 |
| 2009/0073599 A1 | 3/2009 | Nemoto et al. | |
| 2009/0310254 A1 * | 12/2009 | Oikawa et al. | 360/110 |
| 2009/0324973 A1 | 12/2009 | Taguchi | |
| 2010/0149676 A1 * | 6/2010 | Khizorev et al. | 360/55 |

FOREIGN PATENT DOCUMENTS

| | | |
|---|---|---|
| JP | 11 283 230 A | 10/1999 |
| JP | 2001344725 | 12/2001 |
| JP | 2003 168207 | 6/2003 |
| JP | 2007317304 | 12/2007 |
| JP | 2008-103048 | 5/2008 |
| JP | 2008-269789 | 11/2008 |
| JP | 2010009683 | 1/2010 |

(56) References Cited

FOREIGN PATENT DOCUMENTS

| JP | 2010123196 | 6/2010 |
|---|---|---|
| KR | 1020040025430 A | 3/2004 |
| WO | 2004/090874 A1 | 10/2004 |
| WO | 2006/046732 A1 | 5/2006 |

OTHER PUBLICATIONS

Machine Translation of JP 2010-009683-A (pat published 2010).*
Machine Translation of JP 2007-317304-A (pat published 2007).*
Muraoka et al., "Analysis on Magnetization Transition of CGC Perpendicular Media," IEEE Transactions on Magnetics, Jul. 2002, 38(4):1632-1636.
Brändle et al., "Optical and Magneto-Optical Characterization of Evaporated Co/Pt Alloys and Multilayers," IEEE Transactions on Magnetics, Sep. 1992, 28(5): pp. 2967-2969.
Zhang et al., "Pt layer thickness dependence of magnetic properties in Co/Pt multilayers," J. App. Phys., 1991, 69(8), pp. 5649-5651.
Derwent abstract translation of WO2004/090874 A1.
Ashar, "Future Trends in Technology," Chapter 11, Magnetic Disk Drive Technology: Heads, Media, Channel, Interfaces, and Integration, IEEE Press, New York, NY, 1997, pp. 306-333.
Office Action from U.S. Appl. No. 12/389,039, dated Aug. 2, 2010, 14 pp.
Jan. 22, 2013, File history for U.S. Appl. No. 12/684,070.
Sep. 14, 2012, Written Opinion dated Sep. 14, 2012 from Singapore Application No. 201105098-6, 11 pages.
Office Action dated Apr. 21, 2015 from Chinese Application No. 20111027598.7, 6 pages.

* cited by examiner

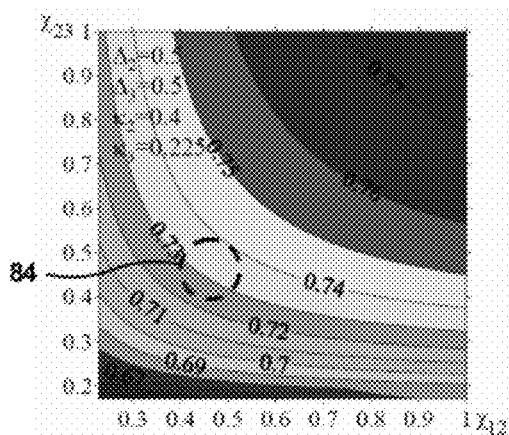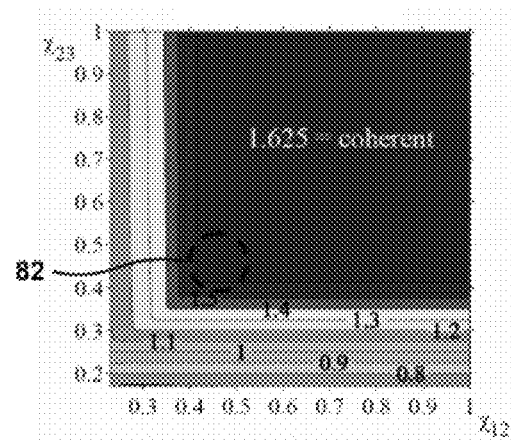
FIG. 7A          FIG. 7B
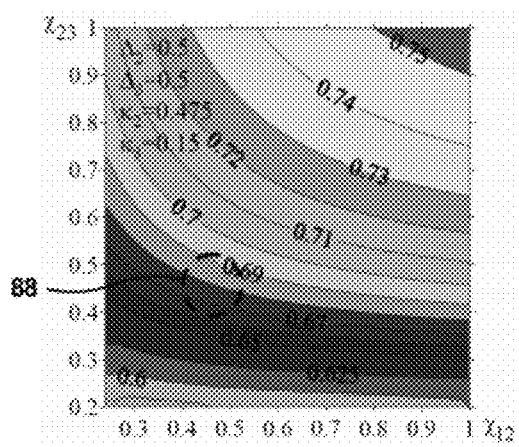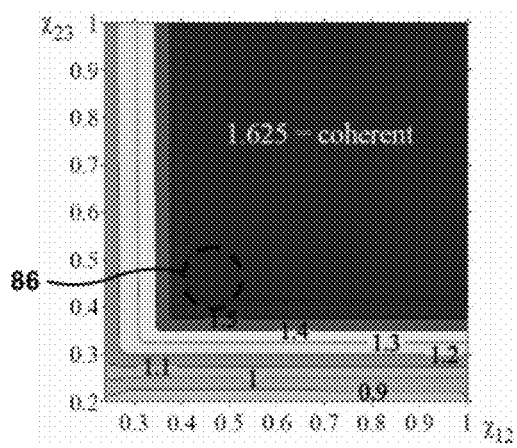
FIG. 8A          FIG. 8B

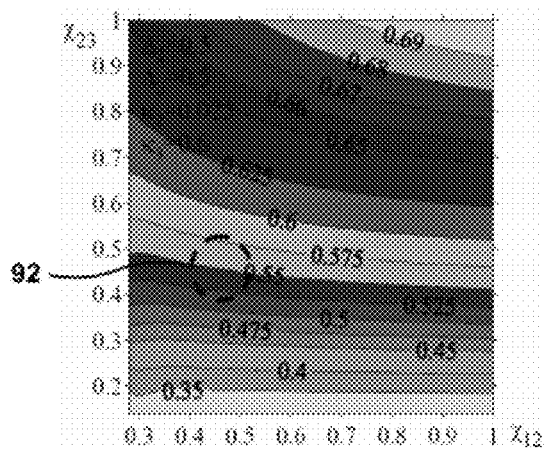
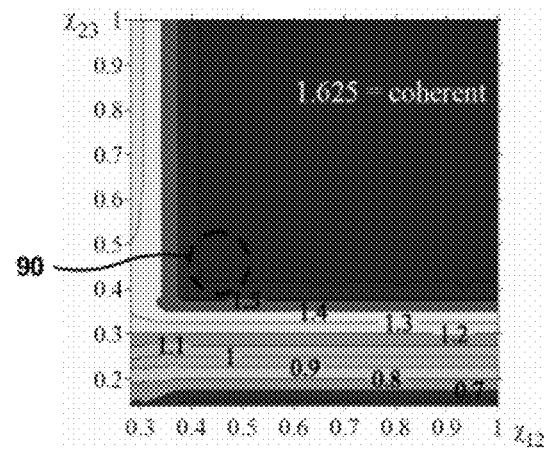
FIG. 9A  FIG. 9B
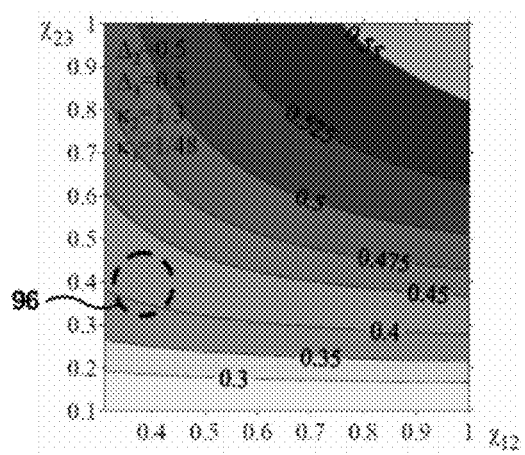
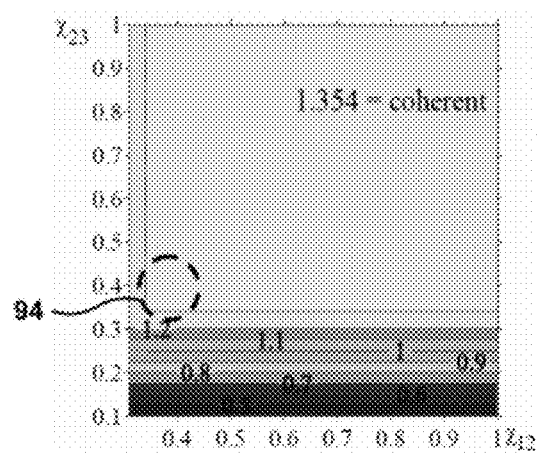
FIG. 10A  FIG. 10B

APPARATUS INCLUDING A PERPENDICULAR MAGNETIC RECORDING LAYER HAVING A CONVEX MAGNETIC ANISOTROPY PROFILE

BRIEF DESCRIPTION OF DRAWINGS

FIGS. 7A and 7B are a switching coercivity contour map and a reduction in energy barrier contour map, respectively, for an example of a magnetic recording layer constructed according to the disclosure.

FIGS. 8A and 8B are a switching coercivity contour map and a reduction in energy barrier contour map, respectively, for an example of a magnetic recording layer constructed according to the disclosure.

FIGS. 9A and 9B are a switching coercivity contour map and a reduction in energy barrier contour map, respectively, for an example of a magnetic recording layer constructed according to the disclosure.

FIGS. 10A and 10B are a switching coercivity contour map and a reduction in energy barrier contour map, respectively, for an example of a magnetic recording layer constructed according to the disclosure.

DETAILED DESCRIPTION

Figure 1:
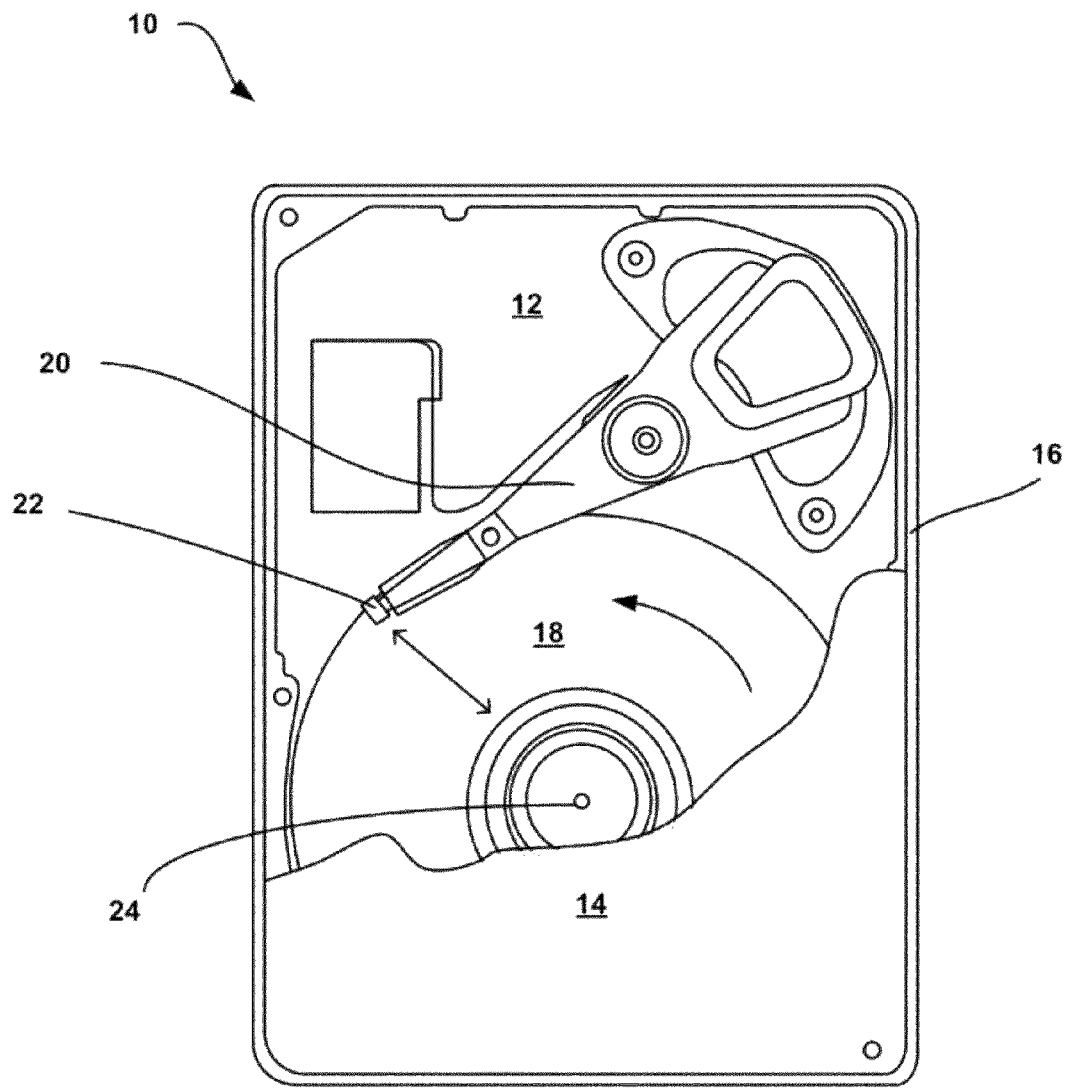
FIG. 1 is a schematic diagram of a hard disc drive.

FIG. 1 illustrates an example of a magnetic disc drive 10 including a magnetic recording medium according to one aspect of the present disclosure. Disc drive 10 includes base 12 and top cover 14, shown partially cut away. Base 12 combines with top cover 14 to form the housing 16 of disc drive 10. Disc drive 10 also includes one or more rotatable magnetic recording media 18. Magnetic recording media 18 are attached to spindle 24, which operates to rotate media 18 about a central axis. Magnetic recording and read head 22 is adjacent to magnetic recording media 18. Actuator arm 20 carries magnetic recording and read head 22 for communication with magnetic recording media 18.

Magnetic recording media 18 store information as magnetically oriented bits in a magnetic recording layer. Magnetic read/write head 22 includes a recording (write) head that generates magnetic fields sufficient to magnetize discrete domains of the magnetic recording layer on magnetic recording media 18. These patterns of domains of the magnetic recording layer represent the bits of data, with changes of the magnetic orientation representing a "1." A "0" is represented by a region comprising a constant magnetization for about twice the bit length. Magnetic recording and read head 22 also includes a read head that is capable of detecting the magnetic fields of the discrete magnetic domains of the magnetic recording layer.

Perpendicular magnetic recording media are magnetic recording media 18 with a perpendicular magnetic anisotropy field ($H_k$) in the magnetic recording layer and magnetization forming in a direction substantially perpendicular to the plane of the magnetic recording layer. Perpendicular magnetic recording media may be employed in magnetic recording systems. Perpendicular magnetic recording media may be fabricated with polycrystalline CoCr or CoPt-oxide containing magnetic recording layers. Co-rich areas in the polycrystalline magnetic recording layer are ferromagnetic while Cr- or oxide-rich areas form proximate grain boundaries in the polycrystalline magnetic recording layer and are non-magnetic. Lateral magnetic exchange coupling between adjacent ferromagnetic grains is attenuated by the non-magnetic areas in between grains.

Progress in magnetic data storage devices, such as disc drive 10, comes primarily through increasing the storage capacity of the device, i.e., though increasing an areal recording density of the magnetic recording medium 18 (expressed in Gigabits per square inch ($Gb/in^2$)). Magnetic storage media 18 with smaller average grain diameters may allow an increase in the areal recording density of the magnetic recording media.

High density perpendicular magnetic recording media may benefit from a balance of several magnetic properties in the magnetic recording layer, including high magnetic anisotropy for thermal stability; low switching field for writability of the recording layer by the magnetic recording head; sufficiently low lateral magnetic exchange coupling among the magnetic grains to maintain a small correlation length between magnetic grains or clusters; sufficiently high lateral magnetic exchange coupling among the magnetic grains to maintain a narrow switching field distribution (SFD); and sufficient uniformity of magnetic properties among the grains to maintain thermal stability and minimize the SFD.

As areal recording density continues to increase, magnetic grains with a smaller average diameter may be used to maintain at a similar value the number of magnetic grains in a recorded bit. However, magnetic stability of magnetic recording media becomes a greater concern as the average grain diameter decreases.

The magnetic grains maintain their magnetization orientation due to magnetic anisotropy energy, which is proportional to the grain volume ($K_u V$, where $K_u$ is magnetic anisotropy energy per unit volume and V is volume). The magnetic anisotropy energy competes with thermal energy fluctuations, which would reorient the magnetization of the grains randomly. Thermal energy fluctuations depend on temperature of the magnetic recording layer ($k_B T$, where $k_B$ is the Boltzmann constant and T is temperature). The ratio of magnetic anisotropy energy to thermal energy ($K_u V/kT$) is referred to as the energy barrier, which is a measure of the magnetic stability of the grains and is proportional to the volume of the respective grains. Thus, reducing grain size (grain volume) increases areal density but reduces thermal stability, for the grains having the same magnetic anisotropy energy per unit volume, $K_u$. While $K_u$ is the label for magnetic anisotropy energy per unit volume, $K_u$ will be termed magnetic anisotropy energy hereinafter for conciseness.

One method of overcoming the reduced thermal stability due to a decrease in average grain size is to increase an average anisotropy field, $H_k$, of the magnetic grains. ($H_k = 2K_u/M_s$, where $M_s$ is the saturation magnetization of the material.) Magnetic grains having a higher magnetic anisotropy field usually have higher magnetic anisotropy energy, $K_u$, and are thus more thermally stable than a similarly sized grain having a lower magnetic anisotropy field. However, increasing the average magnetic anisotropy field of the grains also may increase the magnetic field used to change the magnetic orientation of the grains, thus increasing the magnetic field used to record data.

Described herein are exchange-coupled composite (ECC) structures for magnetic recording layers, which may facilitate writing data to the magnetic recording layer while maintaining thermal stability (i.e., the energy barrier) of the magnetic recording layer at or above an acceptable value. In some embodiments, the ECC structures described herein both facilitate writing data to the magnetic recording layer and increase thermal stability of the recording layer compared to some other magnetic recording layers.

Figure 2:
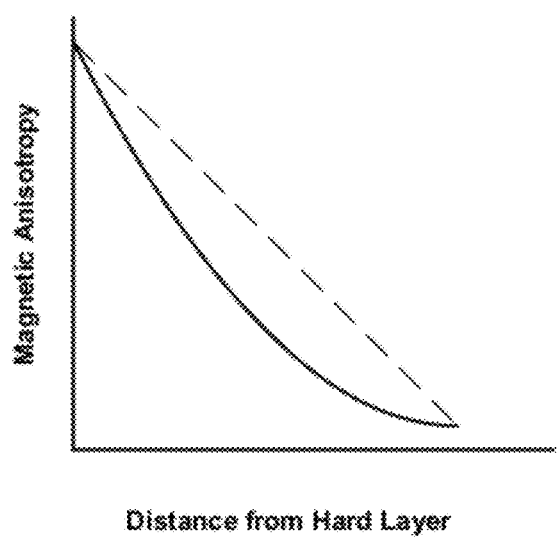
FIG. 2 is an example of a plot of magnetic anisotropy versus distance from hard layer for a magnetic recording layer comprising a continuously graded composition.

Some ECC structures have been proposed in which the magnetic recording layer is composed of a continuously graded material (e.g., a composition of the magnetic recording layer changes substantially continuously and is not divided into separate sub-layers). In such continuously-graded ECC structures, it has further been proposed that the composition gradient should be selected such that a magnetic anisotropy of the magnetic recording layer decreases proportional to a distance from the highest anisotropy portion, squared ($H_k \propto 1/x^2$, where x is the distance from the highest anisotropy portion). In other words, it has been suggested that the magnetic anisotropy of the magnetic recording layer should decrease more quickly in and proximate to the high anisotropy portion of the magnetic recording layer and more slowly as the distance from the high anisotropy portion increases. As illustrated in FIG. 2, this results in a concave shape to a plot of magnetic anisotropy versus position in the magnetic recording layer. In examples in which such a $H_k \propto 1/x^2$ magnetic anisotropy gradient has been proposed, the highest anisotropy portion of the magnetic recording layer is thermally stable without the contribution of the remaining, lower anisotropy portions of the recording layer.

Figure 3:
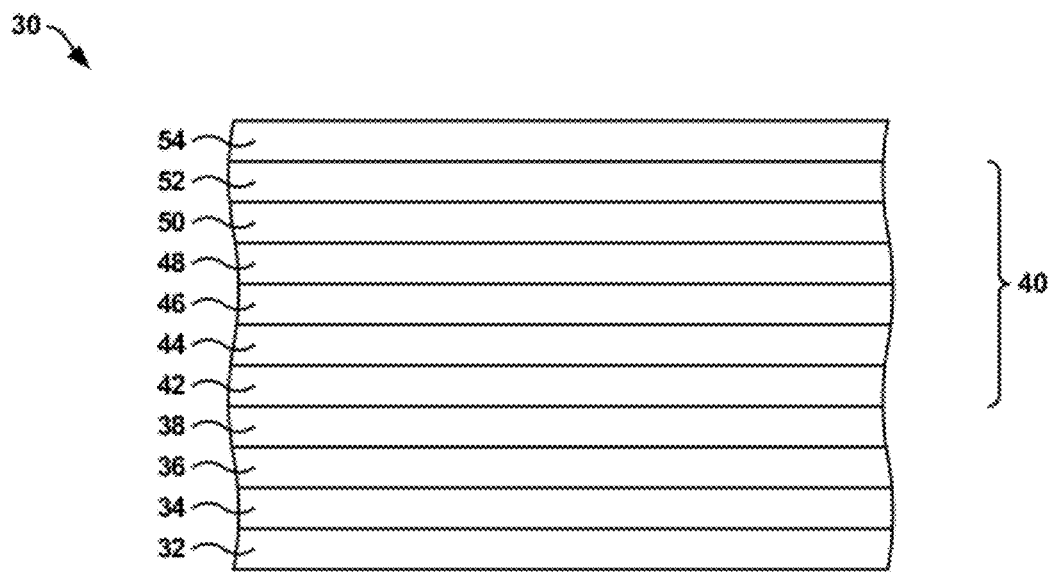
FIG. 3 is a schematic block diagram illustrating an example of a recording media stack including a recording layer comprising a first magnetic layer, a first exchange break layer, a second magnetic layer, a second exchange break layer, and a third magnetic layer.

Magnetic recording media 18 shown in FIG. 1 includes an ECC recording layer structure according to the present disclosure. A schematic block diagram of one embodiment of an ECC recording layer according to the present disclosure is illustrated in FIG. 3. Magnetic recording medium 18 illustrated in FIG. 3 includes a substrate 32, a soft under layer (SUL) 34, a first interlayer 36, a second interlayer 38, a perpendicular recording layer 40, and a protective overcoat 54.

Substrate 32 may include any material that is suitable to be used in magnetic recording media, including, for example, Al, NiP plated Al, glass, or ceramic glass.

Although not shown in FIG. 3, in some embodiments, an additional underlayer may be present immediately on top of substrate 32. The additional underlayer may be amorphous and provides adhesion to the substrate and low surface roughness.

A soft underlayer (SUL) 34 is formed on substrate 32 (or the additional underlayer, if one is present). SUL 34 may be any soft magnetic material with sufficient saturation magnetization ($M_s$) and low magnetic anisotropy field ($H_k$). For example, SUL 34 may be an amorphous soft magnetic material such as Ni; Co; Fe; an Fe-containing alloy such as NiFe (Permalloy), FeSiAl, or FeSiAlN; a Co-containing alloy such as CoZr, CoZrCr, or CoZrNb; or a CoFe-containing alloy such as CoFeZrNb, CoFe, FeCoB, or FeCoC.

First interlayer 36 and second interlayer 38 may be used to establish an HCP (hexagonal close packed) crystalline orientation that induces HCP (0002) growth of the first magnetic layer 42, with a magnetic easy axis perpendicular to the film plane.

A protective overcoat 54, such as, for example, diamond like carbon, may be formed over perpendicular recording layer 40. In other examples, protective overcoat 54 may include, for example, an amorphous carbon layer that further includes hydrogen or nitrogen. Although not illustrated in FIG. 3, in some examples, a lubricant layer may be formed on protective overcoat 54.

Perpendicular recording layer 40 may be formed on second interlayer 38, and may include a first magnetic layer 42, a first exchange break layer 44, a second magnetic layer 46, a second exchange break layer 48, a third magnetic layer 50, and, optionally, a CGC layer 52. First magnetic layer 42 has a first magnetic anisotropy field, $H_{k1}$, second magnetic layer 46 has a second magnetic anisotropy field, $H_{k2}$, and third magnetic layer 50 has a third magnetic anisotropy field, $H_{k3}$. The magnetic anisotropies of first magnetic layer 42, second magnetic layer 46, and third magnetic layer 50 are each oriented in a direction substantially perpendicular to the plane of recording layer 40 (e.g., the magnetic easy axes of first magnetic layer 42, second magnetic layer 46, and third magnetic layer 50 may each be substantially perpendicular to the plane of recording layer 40). First exchange break layer 44 may be used to adjust the vertical exchange coupling between first magnetic layer 42 and second magnetic layer 46, and second exchange break layer 48 may be used to adjust vertical exchange coupling between second magnetic layer 46 and third magnetic layer 50. In some examples, magnetic recording layer 40 may include additional exchange break layers and magnetic layers (e.g., n magnetic layers and as many as n−1 exchange break layers).

Each of first magnetic layer 42, second magnetic layer 46, and third magnetic layer 50 may be granular, and may include magnetic grains substantially separated from adjacent magnetic grains by non-magnetic material. In some embodiments, at least one of first magnetic layer 42, second magnetic layer 46, and third magnetic layer 50 may include a Co alloy, for example, Co in combination with at least one of Cr, Ni, Pt, Ta, B, Nb, O, Ti, Si, Mo, Cu, Ag, Ge, or Fe. In some embodiments, at least one of first magnetic layer 42, second magnetic layer 46, and third magnetic layer 50 may include, for example, an Fe—Pt alloy or a Sm—Co alloy. In some embodiments, at least one of first magnetic layer 42, second magnetic layer 46, and third magnetic layer 50 may include alternating thin layers of a Co alloy and a Pt alloy or a Co alloy and a Pd alloy. In some embodiments, the non-magnetic material separating the grains in at least one of first magnetic layer 42, second magnetic layer 46, and third magnetic layer 50 may comprise an oxide, such as, for example, $SiO_2$, $TiO_2CoO$, $Cr_2O_3$, $Ta_2O_5$, which separate the magnetic grains. In other embodiments, the non-magnetic material separating the grains in at least one of first magnetic layer 42, second magnetic layer 46, and third magnetic layer 50 may comprise Cr, B, C, or another non-ferromagnetic element.

In some examples, at least one of first magnetic layer 42, second magnetic layer 46, and third magnetic layer 50 may comprise a Co—Pt alloy. One method of controlling a magnetic anisotropy field of the layers 42, 46, 50 is controlling the Pt content of the respective layers. For example, a magnetic layer including a greater Pt content may have a higher magnetic anisotropy field than a magnetic layer including a lower Pt content. In some examples, a high magnetic anisotropy field layer may include greater than approximately 18 at. % Pt. In accordance with some examples of the disclosure, the $H_k$ gradient may be defined by the Pt content of first magnetic layer 42, second magnetic layer 46, and third magnetic layer 50. In other words, in some examples, $Pt_1$–$Pt_2$<$Pt_2$–$Pt_3$, where $Pt_1$ is the Pt content of first magnetic layer 42, $Pt_2$ is the Pt content of second magnetic layer 46, and $Pt_3$ is the Pt content of third magnetic layer 50. In one embodiment, $Pt_1$ is between approximately 18 at. % and approximately 22 at. %, $Pt_2$ is between approximately 14 at. % and approximately 18 at. %, and $Pt_3$ is less than approximately 14 at. %, and $Pt_1$–$Pt_2$<$Pt_2$–$Pt_3$.

First exchange break layer 44 and second exchange break layer 48 each comprise a material with relatively low saturation magnetization (MO. For example, at least one of first exchange break layer 44 and second exchange break layer 48 may include a $Co_xRu_{1-x}$ alloy. As another example, at least one of first exchange break layer 44 and second exchange break layer 48 may include or consist essentially of ruthenium. As used herein, "consist essentially of" may indicate that the layer consists of the named material, but may include impurities deposited with the named material, or other elements or materials that have diffused into the layer from adjacent layers. In examples in which first exchange break layer 44 or second exchange break layer 48 comprises a $Co_xRu_{1-x}$ alloy, the break layer 44 or 48 may comprise a thickness of less than approximately 3 nm. In examples in which first exchange break layer 44 or second exchange break layer 48 consists essentially of Ru, the break layer 44 or 48 may be thinner, e.g., less than approximately 3 Å.

In addition to Ru or a $Co_xRu_{1-x}$ alloy, first exchange break layer 44 and/or second exchange break layer 48 may optionally comprise a non-magnetic oxide, such as, for example, $SiO_2$, $TiO_2$, $CoO_2$, $Cr_2O_3$, $Ta_2O_5$. The non-magnetic oxide may serve to facilitate subsequent deposition of a granular second magnetic layer 46 on first exchange break layer 44 or a granular third magnetic layer 50 on second exchange break layer 48. In some embodiments, first exchange break layer 44 and second exchange break layer 48 may comprise substantially similar compositions, while in other embodiments, first exchange break layer 44 and second exchange break layer 48 may comprise different compositions.

Magnetic recording layer 40 optionally may further include CGC layer 52. CGC layer 52 may comprise, for example, a CoCrPtB alloy. In some embodiments, the CoCrPtB alloy may be doped by a metal or rare earth element, such as, for example, Ru, W, or Nb. In some embodiments, CGC layer 52 may include a small amount of an oxide, such as, for example, $SiO_x$, $TiO_x$, $TaO_x$, $WO_x$, $NbO_x$, $CrO_x$, $CoO_x$. In other embodiments, CGC layer 52 may not include an oxide (i.e., may be free from any oxide).

The particular compositions of first magnetic layer 42, second magnetic layer 46, and third magnetic layer 50 may be selected to provide a predetermined magnetic anisotropy field, $H_k$, for each of the respective layers 42, 46, 50. In particular, the composition of first magnetic layer 42 may be selected to provide a first magnetic anisotropy field, $H_{k1}$, the composition of second magnetic layer 46 may be selected to provide a second magnetic anisotropy field, $H_{k2}$, and a composition of third magnetic layer 50 may be selected to provide a third magnetic anisotropy field, $H_{k3}$. In some embodiments, the magnetic anisotropy field of the hardest magnetic layer, which may be first magnetic layer 42 in some implementations, may be limited to a magnetic anisotropy field of approximately 30 kOe (e.g., when formed of a Co alloy). Because of this, the hardest magnetic layer may not be sufficiently stable when an average grain size of magnetic recording layer 40 is sufficiently small. In order to overcome this, an average anisotropy of first magnetic layer 42, second magnetic layer 46, and third magnetic layer 50 may be relatively high such that at least two of the three magnetic layers 42, 46, 50 contribute to thermal stability of the magnetic orientation of magnetic recording layer 40.

One way to accomplish a relatively high average magnetic anisotropy field for first magnetic layer 42, second magnetic layer 46, and third magnetic layer 50, while still obtaining benefits provided by an ECC structure, is to select the compositions of the first, second, and third magnetic layers 42, 46, 50 such that a difference between $H_{k1}$ and $H_{k2}$ (i.e., $H_{k1}$–$H_{k2}$) is less than a difference between $H_{k2}$ and $H_{k3}$ (i.e., $H_{k2}$–$H_{k3}$). In other words, the magnetic anisotropy of the individual layers 42, 46, 50 in magnetic recording layer 40 decreases more slowly, or may even increase, proximate to first magnetic layer 42, and decreases more rapidly as distance from first magnetic layer 42 increases. Such a distribution of magnetic anisotropy fields in magnetic recording layer 40 may be referred to as a convex magnetic anisotropy field distribution. A convex magnetic anisotropy field distribution may provide thermal stability of the magnetic orientation of magnetic recording layer 40 and writability of the recording layer 40. In some examples, a convex magnetic anisotropy distribution may result in a greater proportion of magnetic recording layer 40 being formed of a material with a relatively high magnetic anisotropy field.

The particular values of $H_{k1}$, $H_{k2}$, and $H_{k3}$ may depend on, for example, a recording head used to write data to magnetic recording layer 40, a size of the individual grains in the respective layers 42, 46, 50, the respective magnetic anisotropy field of the other two layers, a thickness of the respective layer, a saturation magnetization of the respective layer, or the like. In some embodiments, the range of $H_k$ values for the respective layers 42, 46, 50 may be affected by the contribution of the $K_uV$ magnetic anisotropy energies of each of the layers 42, 46, 50. For example, a first magnetic layer 42 with a lower value of $K_uV$ is easier to write to than a first magnetic layer 42 with a higher value of $K_uV$ (i.e., it allows a lower applied magnetic field to switch magnetic orientation of the grains in a layer 42 with a lower value of $K_uV$). Thus, a first magnetic layer 42 having a lower value of $K_uV$ may allow use of a second magnetic layer 46 having a lower $H_{k2}$ value and a third magnetic layer 50 having a lower $H_{k3}$ value to drive the ECC-assisted writing process. However, the lower value of $K_uV$ may use a greater magnetic anisotropy energy contribution ($K_uV$) from second magnetic layer 46 and third magnetic layer 50 in order to maintain thermal stability of perpendicular recording layer 40, as a whole. For a layer, e.g., second magnetic layer 46, comprising a given $H_k$ value, the $K_uV$ anisotropy energy contribution may be affected by changing the saturation magnetization, $M_s$, of the material, as $K_uV=2H_kV/M_s$. Additionally or alternatively, the effective volume, V, can be changed by changing the lateral magnetic exchange among grains within the magnetic layer, which can change the effective magnetic cluster size (a cluster of grains that change magnetic orientation under substantially similar conditions).

The ranges of values which $H_{k1}$, $H_{k2}$, and $H_{k3}$ may take may be defined individually for simplicity, but may be better understood when defined in combination with each other, as the differences between $H_{k1}$ and $H_{k2}$ and $H_{k2}$ and $H_{k3}$ are one way of defining the predetermined magnetic recording layer structure. Considered alone, without reference to the $H_k$ values of the other layers, $H_{k1}$ may be between approximately 16 kOe and approximately 24 kOe in some embodiments. In other embodiments, $H_{k1}$ may be greater than approximately 24 kOe or less than 16 kOe. Some examples of values for $H_{k1}$ include approximately 20 kOe or approximately 24 kOe.

In some embodiments, $H_{k2}$ may be between approximately 12 kOe and approximately 24 kOe, while in other embodiments, $H_{k2}$ may be greater than 24 kOe or less than 12 kOe. Some examples of values for $H_{k2}$ include between approximately 12 kOe and approximately 15 kOe, approximately 16 kOe, approximately 19 kOe, or approximately 24 kOe.

In some embodiments, $H_{k3}$ may be less than approximately 15 kOe, while in other embodiments, $H_{k3}$ may be greater than 15 kOe. Some examples of values for $H_{k3}$ include between approximately 3 kOe and approximately 9 kOe, approximately 9 kOe, approximately 6 kOe, or approximately 1 kOe.

Considered together, in some embodiments, $H_{k1}$ may be between approximately 16 kOe and approximately 24 kOe, $H_{k2}$ may be between approximately 12 kOe and approximately 24 kOe, and $H_{k3}$ may be less than $H_{k2}$, such that the values of $H_{k1}$, $H_{k2}$, and $H_{k3}$ satisfy the relationship $H_{k1}-H_{k2} < H_{k2}-H_{k3}$. In some embodiments, $H_{k1}$ is between approximately 20 kOe and approximately 22 kOe, $H_{k2}$ is between approximately 17 kOe and approximately 20 kOe, and $H_{k3}$ is between approximately 9 kOe and approximately 14 kOe.

In another embodiment, Pt concentration in layer 1 is approximately 18-22 at %, Pt concentration in layer 2 is approximately 14-18 at %, and Pt concentration in layer 3 is less than about 14 at %, $H_{k2}$ is approximately 17-20 kOe, and $H_{k3}$ is approximately 9-14 kOe.

In some embodiments, the relationship between $H_{k1}$, $H_{k2}$, and $H_{k3}$ may be further defined by a ratio between $H_{k2}$ and $H_{k1}$ and/or a ratio between $H_{k3}$ and $H_{k2}$. For example, the ratio $H_{k2}/H_{k1}$ may be greater than the ratio $H_{k3}/H_{k2}$. In some embodiments, $H_{k2}/H_{k1}$ may be greater than approximately 0.6 and $H_{k3}/H_{k2}$ may be less than approximately 0.6. In some embodiments, $H_{k2}/H_{k1}$ may be greater than approximately 0.7 and $H_{k3}/H_{k2}$ may be less than approximately 0.7. In some embodiments, $H_{k2}/H_{k1}$ may be greater than approximately 0.9 and $H_{k3}/H_{k2}$ may be less than approximately 0.9. In some embodiments, $H_{k2}/H_{k1}$ may be greater than approximately 1.0 and $H_{k3}/H_{k2}$ may be less than approximately 1.0. In one embodiment, $H_{k2}/H_{k1}$ may be approximately 1.2.

In some embodiments, regardless of the value of $H_{k2}/H_{k1}$, $H_{k3}/H_{k2}$ may be less than approximately 0.6. In some embodiments, $H_{k3}/H_{k2}$ may be less than approximately 0.1.

The saturation magnetizations of first magnetic layer 42, second magnetic layer 46, and third magnetic layer 50 may be the same or may be different. In some embodiments, the saturation magnetization, $M_s$, of each of first magnetic layer 42, second magnetic layer 46, and third magnetic layer 50 may be between approximately 350 emu/cm$^3$ and approximately 700 emu/cm$^3$. In some examples, the saturation magnetization of at least one of first magnetic layer 42, second magnetic layer 46, and third magnetic layer 50 may be between approximately 450 emu/cm$^3$ and approximately 700 emu/cm$^3$. For example, the saturation magnetization of at least one of first magnetic layer 42, second magnetic layer 46, and third magnetic layer 50 may be approximately 550 emu/cm$^3$.

A thickness of first magnetic layer 42 may be between approximately 5 nm and approximately 10 nm. A thickness of second magnetic layer 46 may be between approximately 3 nm and approximately 7 nm, and a thickness of third magnetic layer 50 may be less than approximately 10 nm. As described above, a thickness of each of the respective magnetic layers 42, 46, 50, may have an effect on the selection of the $H_k$ value and/or the $M_s$ value for the respective layers 42, 46, 50. In one embodiment, the thickness of second magnetic layer 46 may be less than approximately 4 nm and $H_{k1}/H_{k2}$ is greater than approximately 0.8 and $H_{k2}/H_{k3}$ is less than approximately 0.8.

FIGS. 4A-4E are diagrams illustrating examples of magnetic anisotropy field configurations for first magnetic layer 42, second magnetic layer 46, and third magnetic layer 50. FIGS. 4A-4E illustrate examples of configurations of magnetic recording layer 40 in which the compositions of first magnetic layer 42, second magnetic layer 46, and third magnetic layer 50 are selected such that the difference $H_{k1}-H_{12}$ is less than the difference $H_{k2}-H_{k3}$. As described above, the relationship between $H_{k1}$, $H_{k2}$, and $H_{k3}$ may be further defined by a first ratio $H_{k2}/H_{k1}$ and/or a second ratio $H_{k3}/H_{k2}$.

Figure 4A:
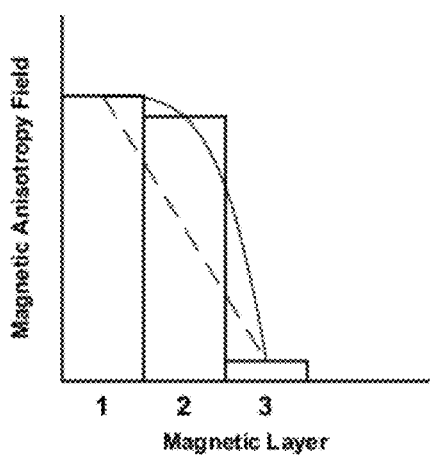
FIGS. 4A-4E are exemplary plots of magnetic anisotropy versus magnetic layer for a plurality of recording layers according to the present disclosure.

For example, FIG. 4A illustrates a magnetic recording layer 40 in which $H_{k1}-H_{k2}$ is less than $H_{k2}-H_{k3}$. Additionally, $H_{k2}/H_{k1}$ may be greater than approximately 0.6, and in some embodiments, may be greater than approximately 0.9. The ratio $H_{k3}/H_{k2}$ of the configuration of magnetic recording layer 40 illustrated in FIG. 4A may be less than approximately 0.6, and may be less than 0.1. For example, $H_{k1}$ may be between approximately 16 kOe and approximately 24 kOe, $H_{k2}$ may be between approximately 12 kOe and approximately 24 kOe, and $H_{k3}$ may be less than approximately 15 kOe. In one embodiment, $H_{k1}$ is approximately 20 kOe, $H_{k2}$ is approximately 16 kOe, and $H_{k3}$ is approximately 9 kOe. In another embodiment, $H_{k1}$ is approximately 20 kOe, $H_{k2}$ is approximately 19 kOe, and $H_{k3}$ is approximately 6 kOe. In a further embodiment, $H_{k1}$ is approximately 24 kOe, $H_{k2}$ is approximately 16 kOe, and $H_{k3}$ is approximately 1 kOe.

Figure 4B:
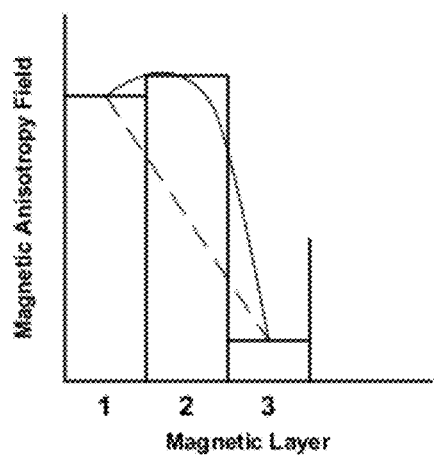

As another example, FIG. 4B illustrates a magnetic recording layer 40 in which $H_{k1}-H_{k2}$ is less than $H_{k2}-H_{k3}$. Additionally, $H_{k1}-H_{k2}$ is less than zero, and $H_{k2}/H_{k1}$ is greater than approximately 1.0, such as, for example, approximately 1.2. In the embodiment illustrated in FIG. 4B, the ratio $H_{k3}/H_{k2}$ may be less than approximately 0.6 and, in some embodiments, may be less than approximately 0.1. In one embodiment, $H_{k1}$ is approximately 20 kOe, $H_{k2}$ is approximately 24 kOe, and $H_{k3}$ is approximately 1 kOe.

Figure 4C:
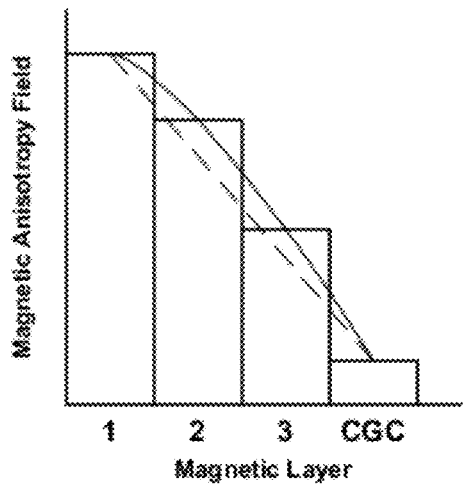
Figure 4D:
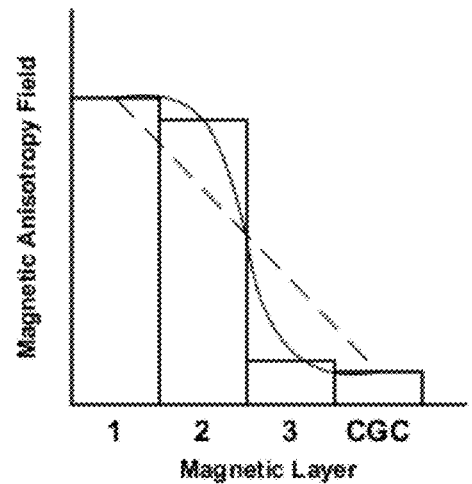
Figure 4E:
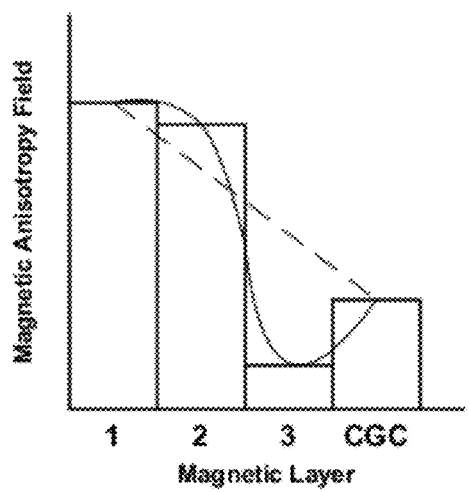

FIGS. 4C-4E illustrate embodiments in which magnetic recording layer 40 includes a CGC layer 52 formed on third magnetic layer 50. In embodiments in which CGC layer 52 is formed directly on third magnetic layer 50, CGC layer 52 and third magnetic layer 50 may act as a single composite layer for purposes of the ECC effect of third magnetic layer 50 and CGC layer 52 on second magnetic layer 46 and first magnetic layer 42. In other words, a thickness-weighted average magnetic anisotropy field, $H_{k34}$, may be approximated by a thickness-weighted average of $H_{k3}$ and a magnetic anisotropy field of CGC layer 52, $H_{k4}$. The composite layer (third magnetic layer 50 and CGC layer 52) may be considered together for contribution of magnetic anisotropy energy $K_u V$, and the calculation of $K_u V$ for the composite layer may be made based on the combined thickness and magnetic moment of third magnetic layer 50 and CGC layer 52. The composite layer comprising third magnetic layer 50 and CGC layer 52 may exert an ECC effect on second magnetic layer 46 and first magnetic layer 42 substantially similar to a single layer comprising a magnetic anisotropy field $H_{k34}$. Lateral exchange coupling among grains within CGC layer 52 may decrease the applied magnetic field used to switch magnetic orientation of grains within CGC layer 52 compared to a layer with an equal $H_k$ but lower lateral exchange coupling. Thus, in some embodiments, the effective $H_{k34}$ may be lower than the thickness-weighted average of $H_{k3}$ and $H_{k4}$. Accordingly, in some embodiments, only $H_{k3}$ and not $H_{k4}$ may be considered when defining the convex magnetic anisotropy grading.

In some embodiments, as illustrated in FIGS. 4C and 4D, CGC layer 52 may comprise a magnetic anisotropy field, $H_{k4}$, that is less than or substantially equal to $H_{k3}$. In some embodiments, as illustrated in FIG. 4C, a difference between the magnetic anisotropy fields of CGC layer 52 and third magnetic layer 50, $H_{k4}-H_{k3}$, may be greater than the difference $H_{k3}-H_{k2}$. In other words, the convex magnetic anisotropy field gradient may extend into CGC layer 52.

In other embodiments, as illustrated by FIG. 4D, $H_{k4}-H_{k3}$ may not be greater than the difference $H_{k3}-H_{k2}$. In such an embodiment, the convex magnetic anisotropy field gradient may not extend into CGC layer 52, but may extend substantially through first magnetic layer 42, second magnetic layer 46, and third magnetic layer 50.

In other embodiments, as illustrated in FIG. 4E, CGC layer 52 may comprise a magnetic anisotropy field, $H_{k4}$, which is greater than $H_{k3}$. Similar to an embodiment in which $H_{k4}-H_{k3}$ is not greater than the difference $H_{k3}-H_{k2}$, when $H_{k4}$ is greater than $H_{k3}$, the convex magnetic anisotropy field gradient may not extend into CGC layer 52, but may extend substantially through first magnetic layer 42, second magnetic layer 46, and third magnetic layer 50.

Figure 5A:
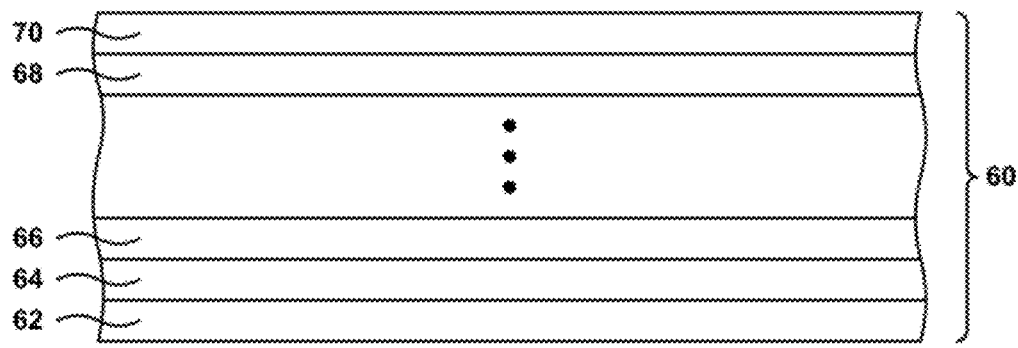
FIG. 5 is a schematic block diagram illustrating an example of a magnetic recording layer comprising n magnetic layers alternating with n−1 exchange break layers.
Figure 5B:
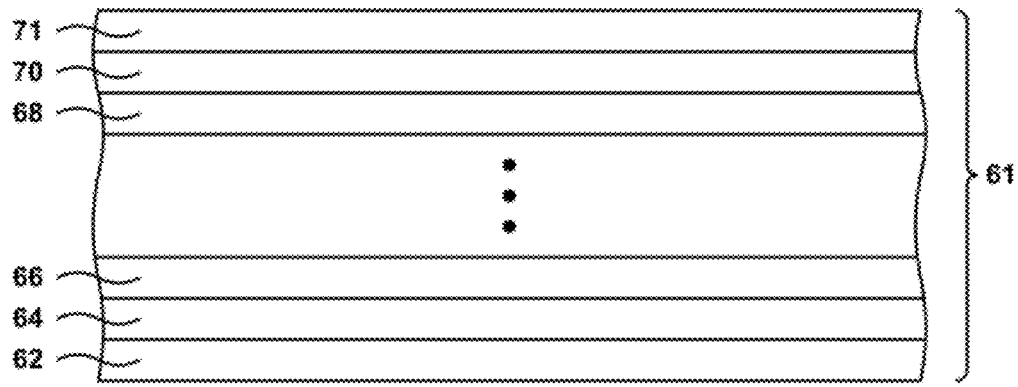

Although the above embodiments have been directed to a magnetic recording layer including three magnetic layers and, optionally, a CGC layer, in some embodiments a magnetic recording layer may include more than three magnetic layers. In general, the concept of a magnetic recording layer including a convex magnetic anisotropy gradient may be extended to any number of magnetic layers. For example, as shown in FIG. 5A, a magnetic recording layer 60 may include (2n−1) layers, including n magnetic layers alternating with n−1 exchange break layers, where n is an integer greater than or equal to 3. Additionally and optionally, magnetic recording layer 61 may include a CGC layer 71 formed on magnetic layer n, as shown in FIG. 5B. In particular, FIG. 5A illustrates a first magnetic layer 62, which may be a granular magnetic layer with a composition that results in a relatively high magnetic anisotropy field. The magnetic anisotropy field of first magnetic layer 62 is oriented in a direction substantially perpendicular to the plane of recording layer 60 (e.g., the magnetic easy axes of grains in first magnetic layer 62 may be substantially perpendicular to the plane of recording layer 60). First magnetic layer 62 may comprise a Co alloy, for example, Co in combination with at least one of Cr, Ni, Pt, Ta, B, Nb, O, Ti, Si, Mo, Cu, Ag, Ge, or Fe. In some embodiments, first magnetic layer 62 may include, for example, an Fe—Pt alloy or a Sm—Co alloy. In some embodiments, first magnetic layer 62 may include alternating thin layers of a Co alloy and a Pt alloy or a Pd alloy. In some embodiments, the non-magnetic material separating the grains in first magnetic layer 62 may comprise an oxide, such as, for example, $SiO_2$, $TiO_2CoO$, $Cr_2O_3$, $Ta_2O_5$, which separate the magnetic grains. In other embodiments, the non-magnetic material separating the grains in first magnetic layer 62 may comprise Cr, B, C, or other non-ferromagnetic elements.

First exchange break layer 64 is formed on first magnetic layer 62. First exchange break layer 64 may include a $Co_xRu_{1-x}$ alloy. As another example, first exchange break layer 64 may include or consist essentially of ruthenium. In examples in which first exchange break layer 64 comprises a $Co_xRu_{1-x}$ alloy, the break layer 64 may comprise a thickness of less than approximately 3 nm. In examples in which first exchange break layer 64 consists essentially of Ru, the break layer 64 may be thinner, e.g., less than approximately 3 Å.

Second magnetic layer 66 is formed on first exchange break layer 64, and may be a granular magnetic layer with a composition that results in a magnetic anisotropy field that is relatively high. As described above, second magnetic layer 66 may have a magnetic anisotropy that is less than, substantially equal to, or greater than the magnetic anisotropy of first magnetic layer 62. The magnetic anisotropy of second magnetic layer 66 is oriented in a direction substantially perpendicular to the plane of recording layer 60 (e.g., the easy axes of grains in second magnetic layer 66 may be substantially perpendicular to the plane of recording layer 60). Second magnetic layer 66 may comprise a Co alloy, such as Co in combination with at least one of Cr, Ni, Pt, Ta, B, Nb, O, Ti, Si, Mo, Cu, Ag, Ge, or Fe. In some embodiments, second magnetic layer 66 may include, for example, an Fe—Pt alloy or a Sm—Co alloy. In some embodiments, second magnetic layer 66 may include alternating thin layers of a Co alloy and a Pt alloy or a Pd alloy. In some embodiments, the non-magnetic material separating the grains in second magnetic layer 66 may comprise an oxide, such as, for example, $SiO_2$, $TiO_2CoO$, $Cr_2O_3$, $Ta_2O_5$, which separate the magnetic grains. In other embodiments, the non-magnetic magnetic material separating the grains in second magnetic layer 66 may comprise Cr, B, C, or another non-ferromagnetic element.

Magnetic recording layer 60 may include an arbitrary number of magnetic layers and exchange break layers in an alternating pattern. Each subsequent magnetic layer may have composition selected such that magnetic recording layer 60 includes a convex magnetic anisotropy field gradient among its plurality of magnetic layers. In other words, the compositions of the respective magnetic layer may be selected such that $H_{k(n-2)}-H_{k(n-1)}$ is less than $H_{k(n-1)}-H_{k(n)}$, where $H_{k1}$ is the magnetic anisotropy field of layer i. For example, the compositions of first magnetic layer 62, second magnetic layer 66, and a third magnetic layer (not shown) may be selected such that $H_{k1}-H_{k2}$ is less than $H_{k2}-H_{k3}$. Exchange break layer n−1 68 is formed on magnetic layer n−1 (not shown). Exchange break layer n−1 68 may comprise ruthenium or a ruthenium alloy, and may have a similar composition to first exchange break layer 64 or a different composition than first exchange break layer 64. In some embodiments, exchange break layer n−1 68 may consist essentially of or consist of ruthenium, while in other embodiments, exchange break layer n−1 68 may comprise a ruthenium alloy, e.g., $Co_xRu_{1-x}$. In addition to Ru or a $Co_xRu_{1-x}$ alloy, exchange break layer n−1 68 may optionally include a non-magnetic oxide, such as, for example, $SiO_2$, $TiO_2CoO$, $Cr_2O_3$, or $Ta_2O_5$.

Magnetic layer n 70 is formed on exchange break layer n−1 68, and in some embodiments may be a granular magnetic layer with magnetic anisotropy that is relatively low, e.g., lower than the magnetic anisotropy of any other of the magnetic layers in recording layer 60. Magnetic layer n has a magnetic anisotropy field oriented in a direction substantially perpendicular to the plane of recording layer 60. Magnetic layer n 70 may include, for example, a Co alloy, an Fe—Pt alloy, or a Sm—Co alloy, and may or may not include a non-magnetic oxide, such as, for example, $SiO_2$, $TiO_2CoO$, $Cr_2O_3$, $Ta_2O_5$, as described above. The composition of magnetic layer n 70 may be different than the composition of first magnetic layer 62 and/or second magnetic layer 66, such that magnetic layer n 70 has a magnetic anisotropy field that, along with the magnetic anisotropy fields of the other magnetic layers in magnetic recording layer 60, results in a convex magnetic field gradient. For example, magnetic layer n 70 may include similar components as first magnetic layer 62 and/or second magnetic layer 66, but in different proportions.

In some embodiments, CGC layer 71 (shown in FIG. 5B) may be similar to CGC layer 52 described above with reference to FIG. 3.

Figure 6:
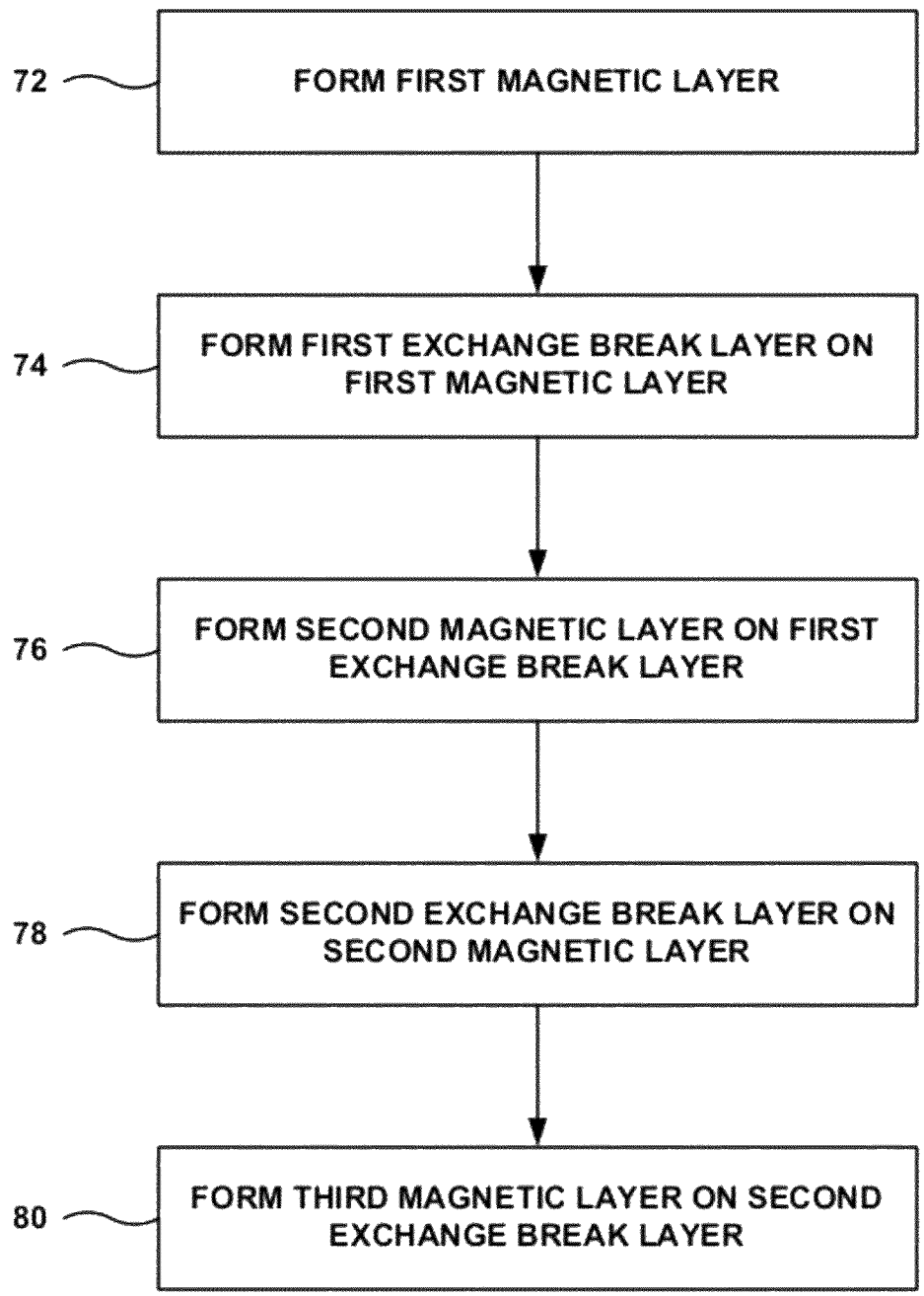
FIG. 6 is a flow diagram that illustrates an example of a technique for forming a magnetic recording layer.

A method of forming a perpendicular magnetic recording layer is illustrated in FIG. 6. The method may fainting a first magnetic layer having a magnetic anisotropy field, $H_{k1}$ (72), forming a first exchange break layer on the first magnetic layer (74), and forming a second magnetic layer on the first exchange break layer (76). The second magnetic layer has a second magnetic anisotropy field, $H_{k2}$. In some embodiments, the method further includes forming a second exchange break layer on the second magnetic layer (78) and forming a third magnetic layer on the second exchange break layer (80). The third magnetic layer has a third magnetic anisotropy field, $H_{k3}$. In some embodiments, $H_{k1}-H_{k2}$ is less than $H_{k2}-H_{k3}$.

Although magnetic recording layers described herein have included break layers alternating with magnetic layers, in some embodiments, a magnetic recording layer may not include a break layer between each pair of adjacent magnetic layers. For example, a magnetic recording layer may include a second magnetic layer 46 and a third magnetic layer 50 (FIG. 3) formed immediately adjacent each other, without an intervening second break layer 48. This concept may be extended to other pairs of magnetic layers, such as first magnetic layer 42 and second magnetic layer 46. Additionally, in embodiments including more than three magnetic layers (e.g., embodiments such as those described with reference to FIG. 5), magnetic recording layer 60 may include as many as 2n−1 layers, including n magnetic layers and as many as n−1 break layers. In such embodiments, some adjacent magnetic layer pairs may include intervening break layers, and other adjacent magnetic layer pairs may not include intervening break layers.

Although the foregoing disclosure has been primarily directed to an apparatus that includes a magnetic recording medium, the magnetic layer structure described herein may also be utilized in other applications. For example, the magnetic layer structure described herein may be utilized in a magnetic sensor or magnetoresistive random access memory (MRAM).

EXAMPLES

The following examples are illustrative of embodiments of the disclosure, but do not limit the scope of the disclosure. The examples were based on theoretical calculations using idealized magnetic layers. The magnetic layers each had the same values of $M_s$ and $H_{ex}$. The magnetic recording layers in the examples did not include a CGC layer. In the following examples, parameters are defined as following. Equation 1 defines an effective magnetic thickness of a layer i, $\Delta_i$:

$$\Delta_i = \frac{M_{si}\delta_i}{M_{s1}\delta_1} \quad \text{Equation 1}$$

where $M_{si}$ is a saturation magnetization of layer i, $\delta_i$ is a thickness of layer i, $M_{s1}$ is a saturation magnetization of layer 1 (i.e., a first magnetic layer), and $\delta_1$ is a thickness of layer 1.

Equation 2 defines an effective anisotropy of a layer i, $\kappa_i$:

$$\kappa_i = \frac{M_{si}H_{Ai}\delta_i}{M_{s1}H_{A1}\delta_1} = \Delta_i \frac{H_{Ai}}{H_{A1}} \quad \text{Equation 2}$$

where $M_{si}$ is a saturation magnetization of layer i, $H_{Ai}$ is a magnetic coercivity of layer i, $\delta_i$ is a thickness of layer i, $M_{s1}$ is a saturation magnetization of layer 1, $H_{A1}$ is a magnetic coercivity of layer 1, and $\delta_1$ is a thickness of layer 1.

Equation 3 defines an effective coupling between a layer i and a layer j, $\chi_{ij}$:

$$\chi_{ij} = \frac{2J_{ij}}{K_1\delta_1} \quad \text{Equation 3}$$

where $J_{ij}$ is a quantum mechanical coupling between layer i and layer j, $K_1$ is a magnetic anisotropy energy of layer 1, and $\delta_1$ is a thickness of layer 1.

For the following Examples, certain parameters were held fixed. For example, $\Delta_2=\Delta_3=0.5\,\Delta_1$. In other words, the effective thicknesses of layers 2 and 3 were set to be equal, and each one-half the effective thickness of layer 1.

In evaluating Examples 1-3 below, comparison was made to a respective coherently switching three-layer magnetic recording layer, in which the three magnetic layers had magnetic anisotropies of $H_{A1}$, $H_{A2}=0.75H_{A1}$, and $H_{A3}=0.5H_{A1}$. Such a magnetic anisotropy distribution resulted in an average magnetic anisotropy $<H_A>$ of $0.8125H_{A1}$. In making the Examples, then, $<H_A>$ was kept constant, and a $\kappa_2$ value was selected, which set the $\kappa_3$ value. $\chi_{12}$ and $\chi_{23}$ were free parameters.

Example 1

FIGS. 7A and 7B illustrate an example in which the magnetic anisotropy value, $H_{A1}$, of magnetic layer 1 was 20 kOe, the magnetic anisotropy value, $H_{A2}$, of magnetic layer 2 was 16 kOe, and the magnetic anisotropy value, $H_{A3}$, of magnetic layer 3 was 9 kOe. Such magnetic anisotropy distribution is a convex magnetic anisotropy gradient according to the disclosure. $H_{A1}-H_{A2}$ is 4 kOe, which is less than $H_{A2}-H_{A3}$, which is 7 kOe. Further, $H_{A2}/H_{A1}$ is 0.8, which is greater than $H_{A3}/H_{A2}$ (0.5625). In Example 1, $\Delta_2=\Delta_3=0.5$, $\kappa_2=0.4$, $\kappa_3=0.225$.

Magnetic orientation switching performance of Example 1 was compared with a reference three-layer magnetic recording layer that switched coherently, e.g., in which the three magnetic layers were coupled and acted as a single magnetic layer with an effective anisotropy calculated as an effective thickness-weighted average of the anisotropies of the respective layers. The first magnetic layer had an anisotropy of $H_{A1}=20$ kOe and a relative effective thickness of 1, the second magnetic layer had an anisotropy of $H_{A2}=0.8H_{A1}=16$ kOe and a relative effective thickness of 0.5, and the third magnetic layer had an anisotropy of $H_{A3}=0.45H_{A1}=9$ kOe and a relative effective thickness of 0.5. Such a magnetic anisotropy distribution resulted in an effective thickness-weighted average magnetic anisotropy $<H_A>$ of $0.8125H_{A1}=16.25$ kOe, and an energy barrier change $\Delta E/\Delta E_1$ of 1.625. The energy barrier change indicates the effect the second and third magnetic layers have on thermal stability of the magnetic recording layer compared to a magnetic recording layer including only the first magnetic layer.

In comparing magnetic orientation switching performance of Example 1 with the reference coherently-switching magnetic recording layer, a minimum normalized $H_{sw}$ value (an effective coercivity of the magnetic recording layer; equal to the applied magnetic field at which the orientation of the magnetic recording layer switched, normalized by the coercivity of the first magnetic layer) was found at an energy barrier substantially equal to the energy barrier of the reference magnetic recording layer (1.625), With reference to FIGS. 7A and 7B, approximate coordinates of circle 82 are $\chi_{12}=0.45$ and $\chi_{23}=0.45$. Turning to FIG. 7A, the normalized $H_{sw}$ value at $\chi_{12}=0.45$ and $\chi_{23}=0.45$ is approximately 0.73, as illustrated by circle 84. Comparing this to the normalized $H_{sw}$ value of the reference film, 0.8125, the magnetic anisotropy gradient in Example 1 provides a reduction in normalized $H_{sw}$ of approximately 11%. In other words, a magnetic recording layer comprising three magnetic layers selected to provide a convex magnetic anisotropy gradient may switch more easily than and have comparable thermal stability to a magnetic recording layer comprising three magnetic layers selected to provide a linear magnetic anisotropy gradient.

Example 2

FIGS. 8A and 8B illustrate an example in which the magnetic anisotropy value, $H_{A1}$, of magnetic layer 1 was 20 kOe, the magnetic anisotropy value, $H_{A2}$, of magnetic layer 2 was 19 kOe, and the magnetic anisotropy value, $H_{A3}$, of magnetic layer 3 was 6 kOe, Such magnetic anisotropy distribution is a convex magnetic anisotropy gradient according to the disclosure. $H_{A1}-H_{A2}$ is 1 kOe, which is less than $H_{A2}-H_{A3}$, which is 13 kOe. Further, $H_{A2}/H_{A1}$ is 0.95, which is greater than $H_{A3}/H_{A2}$ (0.3158). In Example 2, $\Delta_2=\Delta_3=0.5$, $\kappa_2=0.475$, $\kappa_3=0.15$.

Magnetic orientation switching performance of Example 2 was compared with a reference three-layer magnetic recording layer that switched coherently, e.g., in which the three magnetic layers were coupled and acted as a single magnetic layer with an effective anisotropy calculated as an effective thickness-weighted average of the anisotropies of the respective layers. The first magnetic layer had an anisotropy of $H_{A1}=20$ kOe and a relative effective thickness of 1, the second magnetic layer had an anisotropy of $H_{A1}=0.95H_{A1}=19$ kOe and a relative effective thickness of 0.5, and the third magnetic layer had an anisotropy of $H_{A3}=0.3H_{A1}=6$ kOe and a relative effective thickness of 0.5. Such a magnetic anisotropy distribution resulted in an average magnetic anisotropy $<H_A>$ of $0.8125H_{A1}=16.25$ kOe, and an energy barrier change $\Delta E/\Delta E_1$ of 1.625. The energy barrier change indicates the effect the second and third magnetic layers have on thermal stability of the magnetic recording layer compared to a magnetic recording layer including only the first magnetic layer.

In comparing magnetic orientation switching performance of Example 2 with the reference coherently-switching magnetic recording layer, a minimum normalized $H_{sw}$ value was found at an energy barrier substantially equal to the energy barrier of the reference magnetic recording layer (1.625). With reference to FIGS. 8A and 8B, approximate coordinates of circle 86 are $\chi_{12}=0.45$ and $\chi_{23}=0.45$. Turning to FIG. 8A, the normalized $H_{sw}$ value at $\chi_{12}=0.45$ and $\chi_{23}=0.45$ is approximately 0.68, as illustrated by circle 88. Comparing this to the normalized $H_{sw}$ value of the reference film, 0.8125, the magnetic anisotropy gradient in Example 2 provides a reduction in normalized $H_{sw}$ of approximately 20%. Again, a magnetic recording layer comprising three magnetic layers selected to provide a convex magnetic anisotropy gradient may switch more easily than and have comparable thermal stability to a magnetic recording layer comprising three magnetic layers selected to provide a linear magnetic anisotropy gradient.

Example 3

FIGS. 9A and 9B illustrate an example in which the magnetic anisotropy value, $H_{A1}$, of magnetic layer 1 was 20 kOe, the magnetic anisotropy value, $H_{A2}$, of magnetic layer 2 was 24 kOe, and the magnetic anisotropy value, $H_{A3}$, of magnetic layer 3 was 1 kOe. Such magnetic anisotropy distribution is a convex magnetic anisotropy gradient according to the disclosure. $H_{A1}-H_{A2}$ is $-4$ kOe, which is less than $H_{A2}-H_{A3}$, which is 23 kOe. Further, $H_{A2}/H_{A1}$ is 1.2, which is greater than $H_{A3}/H_{A2}$ (0.0417). In Example 3, $\Delta_2=\Delta_3=0.5$, $\kappa_2=0.6$, $\kappa_3=0.025$.

Magnetic orientation switching performance of Example 3 was compared with a reference three-layer magnetic recording layer that switched coherently, e.g., in which the three magnetic layers were coupled and acted as a single magnetic layer with an effective anisotropy calculated as an effective thickness-weighted average of the anisotropies of the respective layers. The first magnetic layer had an anisotropy of $H_{A1}=20$ kOe and a relative effective thickness of 1, the second magnetic layer had an anisotropy of $H_{A2}=1.2H_{A1}=24$ kOe and a relative effective thickness of 0.5, and the third magnetic layer had an anisotropy of $H_{A3}=0.05H_{A1}=1$ kOe and a relative effective thickness of 0.5. Such a magnetic anisotropy distribution resulted in an average magnetic anisotropy $<H_A>$ of $0.8125H_{A1}=16.25$ kOe, and an energy barrier change $\Delta E/\Delta E_1$ of 1.625. The energy barrier change indicates the effect the second and third magnetic layers have on thermal stability of the magnetic recording layer compared to a magnetic recording layer including only the first magnetic layer.

In comparing magnetic orientation switching performance Example 3 with the reference coherently-switching magnetic recording layer, a minimum normalized $H_{sw}$ value (an effective coercivity of the magnetic recording layer; equal to the applied magnetic field at which the orientation of the magnetic recording layer switched, normalized by the anisotropy of the first magnetic layer) was found at an energy barrier substantially equal to the energy barrier of the reference magnetic recording layer (1.625). With reference to FIGS. 9A and 9B, approximate coordinates of circle 90 are $\chi_{12}=0.45$ and $\chi_{23}=0.45$. Turning to FIG. 9A, the normalized $H_{sw}$ value at $\chi_{12}=0.45$ and $\chi_{23}=0.45$ is approximately 0.55, as illustrated by circle 92. Comparing this to the normalized $H_{sw}$ value of the reference film, 0.8125, the magnetic anisotropy gradient in Example 3 provides a reduction in normalized $H_{sw}$ of approximately 48%. This demonstrates that a magnetic recording layer comprising three magnetic layers selected to provide a convex magnetic anisotropy gradient may switch more easily than and have comparable thermal stability to a magnetic recording layer comprising three magnetic layers selected to provide a linear magnetic anisotropy gradient.

Example 4

FIGS. 10A and 10B illustrate an example in which the magnetic anisotropy value, $H_{A1}$, of magnetic layer 1 was 24 kOe, the magnetic anisotropy value, $H_{A2}$, of magnetic layer 2 was 16 kOe, and the magnetic anisotropy value, $H_{A3}$, of magnetic layer 3 was 1 kOe. Such magnetic anisotropy distribution is a convex magnetic anisotropy gradient according to the disclosure. $H_{A1}-H_{A2}$ is 4 kOe, which is less than $H_{A2}-H_{A3}$, which is 15 kOe. Further, $H_{A2}/H_{A1}$ is 0.667, which is greater than $H_{A3}/H_{A2}$ (0.0625). In Example 4, $\Delta_2=\Delta_3=0.5$, $\kappa_2=\frac{1}{3}$, $\kappa_3=\frac{1}{48}$.

Magnetic orientation switching performance of Example 4 was compared with a reference three-layer magnetic recording layer that switched coherently, e.g., in which the three magnetic layers were coupled and acted as a single magnetic layer with an effective anisotropy calculated as an effective thickness-weighted average of the anisotropies of the respective layers. The first magnetic layer had an anisotropy of $H_{A1}=24$ kOe and a relative effective thickness of 1, the second magnetic layer had an anisotropy of $H_{A2}=(\frac{2}{3})H_{A1}=16$ kOe and a relative effective thickness of 0.5, and the third magnetic layer had an anisotropy of $H_{A3}=(1/24)H_{A1}=-1$ kOe and a relative effective thickness of 0.5. Such a magnetic anisotropy distribution resulted in an average magnetic anisotropy $<H_A>$ of $0.677H_{A1}=16.25$ kOe, and an energy barrier change $\Delta E/\Delta E_1$ of 1.354. The energy barrier change indicates the effect the second and third magnetic layers have on thermal stability of the magnetic recording layer compared to a magnetic recording layer including only the first magnetic layer.

In comparing magnetic orientation switching performance of Example 4 with the reference coherently-switching magnetic recording layer, a minimum normalized $H_{sw}$ value was found at an energy barrier substantially equal to the energy barrier of the reference magnetic recording layer (1.354). With reference to FIGS. 10A and 10B, approximate coordinates of circle 94 are $\chi_{12}=0.35$ and $\chi_{23}=0.4$. Turning to FIG. 10A, the normalized $H_{sw}$ value at $\chi_{12}=0.35$ and $\chi_{23}=0.4$ is approximately 0.42, as illustrated by circle 96. Comparing this to the normalized Hsw value of the reference film, 0.677, the magnetic anisotropy gradient in Example 4 provides a reduction in normalized $H_{sw}$ of approximately 61%. This demonstrates that a magnetic recording layer comprising three magnetic layers selected to provide a convex magnetic anisotropy gradient may switch more easily than and have comparable thermal stability to a magnetic recording layer comprising three magnetic layers selected to provide a linear magnetic anisotropy gradient.

Various embodiments of the disclosure have been described. The implementations described above and other implementations are within the scope of the following claims.

The invention claimed is:

1. An apparatus comprising:
a first magnetic layer having a first magnetic anisotropy field, $H_{k1}$;
a first exchange break layer formed on the first magnetic layer;
a second magnetic layer formed on the first exchange break layer, wherein the second magnetic layer has a second magnetic anisotropy field, $H_{k2}$;
a second exchange break layer formed on the second magnetic layer;
a third magnetic layer formed on the second exchange break layer, wherein the third magnetic layer has a third magnetic anisotropy field, $H_{k3}$, and wherein $H_{k1}-H_{k2}$ is less than $H_{k2}-H_{k3}$; and
a continuous granular composite layer formed over the third magnetic layer, wherein the continuous granular composite layer and the third magnetic layer comprise an exchange-coupled composite structure configured to exert an exchange-coupled composite effect having a thickness-weighted average magnetic anisotropy field, $H_{k34}$, on the first and second magnetic layers, and wherein the continuous granular composite layer comprises a layer having a Pt content, $Pt_4$, that is greater than a Pt content of the third magnetic layer, $Pt_3$.

2. The apparatus of claim 1, wherein a first ratio $H_{k2}/H_{k1}$ is greater than a second ratio $H_{k3}/H_{k2}$.

3. The apparatus of claim 2, wherein a first ratio is greater than approximately 0.6.

4. The apparatus of claim 2, wherein the first ratio is greater than approximately 0.9.

5. The apparatus of claim 2, wherein the first ratio is greater than approximately 1.0.

6. The apparatus of claim 1, wherein the first magnetic layer comprises a Pt content, $Pt_1$, content between approximately 18 at. % and approximately 22 at. %, the second magnetic layer comprises a Pt content, $Pt_2$, between approximately 14 at. % and approximately 18 at. %, and the third magnetic layer comprises a Pt content, $Pt_3$, less than approximately 14 at. %, and wherein $Pt_1-Pt_2$ is less than $Pt_2-Pt_3$.

7. The apparatus of claim 1, wherein the first magnetic layer comprises a first granular magnetic layer comprising a first magnetic material and a first oxide, and wherein the second magnetic layer comprises a second granular magnetic layer comprising a second magnetic material and a second oxide.

8. The apparatus of claim 1, wherein the continuous granular composite layer has a magnetic anisotropy field $H_{k4}$, and wherein $H_{k4}$ is greater than $H_{k3}$.

9. The apparatus of claim 1, wherein the continuous granular composite layer has a magnetic anisotropy field $H_{k4}$, and wherein $H_{k4}$ is less or approximately equal to $H_{k3}$.

10. The apparatus of claim 1, wherein $H_{k1}$ is between approximately 16 kOe and approximately 24 kOe.

11. The apparatus of claim 10, wherein $H_{k2}$ is between approximately 12 kOe and approximately 24 kOe.

12. The apparatus of claim 11, wherein $H_{k3}$ is less than approximately 15 kOe.

13. The apparatus of claim 1, wherein $H_{k1}$ is between approximately 20 kOe and approximately 22 kOe, wherein $H_{k2}$ is between approximately 17 kOe and approximately 20 kOe, and wherein $H_{k3}$ is between approximately 9 kOe and approximately 14 kOe.

14. The apparatus of claim 1, wherein at least one of the first magnetic layer, the second magnetic layer, and the third magnetic layer comprises at least one of a Co alloy, alternating layers of a Co alloy and a Pt alloy, or alternating layers of a Co alloy and a Pd alloy.

15. The apparatus of claim 1, wherein $Pt_4$ is greater than approximately 14 at. %.

16. The apparatus of claim 1, wherein $H_{k2}$ is greater than $H_{k1}$.

17. The apparatus of claim 16, wherein the second magnetic layer has magnetic anisotropy energy, $K_{u2}$, and the first magnetic layer has magnetic anisotropy energy, $K_{u1}$, wherein $K_{u2}$ is smaller than $K_{u1}$.

18. The apparatus of claim 1, wherein the continuous granular composite layer comprises a CoCrPtB alloy.

19. The apparatus of claim 18, wherein the CoCrPtB alloy is doped with Ru, W, or Nb.

20. The apparatus of claim 1, wherein the continuous granular composite layer does not include a substantial amount of oxide.

21. An apparatus comprising:
a first magnetic layer having a first magnetic anisotropy field, $H_{k1}$ and a first magnetic anisotropy energy, $K_{u1}$;
a first exchange break layer formed on the first magnetic layer;
a second magnetic layer formed on the first exchange break layer, wherein the second magnetic layer has a second magnetic anisotropy field, $H_{k2}$, and a second magnetic anisotropy energy, $K_{u2}$, wherein $H_{k2}$ is greater than $H_{k1}$ and $K_{u2}$ is smaller than $K_{u1}$;
a second exchange break layer formed on the second magnetic layer;
a third magnetic layer formed on the second exchange break layer, wherein the third magnetic layer has a third magnetic anisotropy field, $H_{k3}$, and wherein $H_{k1}-H_{k2}$ is less than $H_{k2}-H_{k3}$; and
a continuous granular composite layer formed over the third magnetic layer, wherein the continuous granular composite layer and the third magnetic layer comprise an exchange-coupled composite structure configured to exert an exchange-coupled composite effect having a thickness-weighted average magnetic anisotropy field, $H_{k34}$, on the first and second magnetic layers.

* * * * *